US 8,639,209 B2

(12) United States Patent
Walby et al.

(10) Patent No.: US 8,639,209 B2
(45) Date of Patent: Jan. 28, 2014

(54) APPARATUS AND METHOD FOR DETECTING A CLONED BASE STATION

(75) Inventors: James Walby, Delavan, WI (US); Robert F. D'Avello, Lake Zurich, IL (US); Harsha Dabholkar, Libertyville, IL (US); James Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1034 days.

(21) Appl. No.: 12/643,353

(22) Filed: Dec. 21, 2009

(65) Prior Publication Data
US 2011/0151796 A1   Jun. 23, 2011

(51) Int. Cl.
*H04M 11/04*   (2006.01)

(52) U.S. Cl.
USPC ............... 455/404.1; 455/404.2; 455/414.1; 455/67.11; 455/67.13; 455/68; 455/69; 455/556.1; 455/99; 455/456.1; 455/456.3; 340/426.1; 340/426.18; 340/426.19; 340/426.24; 340/426.26

(58) Field of Classification Search
USPC ............ 455/404.1–404.2, 410–411, 455/414.1–414.2, 521, 527, 67.11, 67.13, 455/68–69, 556.1–556.2, 557, 99, 455/456.1–456.4, 418, 420; 340/902–905, 340/426.1, 426.11–426.19, 426.2–426.29, 340/426.3–426.36
See application file for complete search history.

(56) References Cited

U.S. PATENT DOCUMENTS

| | | | |
|---|---|---|---|
| 5,895,436 A * | 4/1999 | Savoie et al. | 701/468 |
| 6,330,438 B1 * | 12/2001 | McClelland et al. | 455/421 |
| 6,803,861 B2 | 10/2004 | Flick | |
| 7,091,835 B2 * | 8/2006 | Boulay et al. | 340/426.19 |
| 7,737,841 B2 * | 6/2010 | Derrick et al. | 340/539.13 |
| 7,925,740 B2 * | 4/2011 | Nath et al. | 709/224 |
| 2002/0014978 A1 | 2/2002 | Flick | |
| 2002/0163906 A1 | 11/2002 | Diachina et al. | |
| 2003/0222813 A1 | 12/2003 | Boulay et al. | |
| 2004/0005858 A1 | 1/2004 | Cervinka et al. | |
| 2004/0075539 A1 * | 4/2004 | Savoie et al. | 340/426.1 |
| 2005/0088318 A1 | 4/2005 | Liu et al. | |
| 2005/0090952 A1 * | 4/2005 | Boulay et al. | 701/33 |

(Continued)

FOREIGN PATENT DOCUMENTS

| DE | 10009488 A1 | 11/2000 |
|---|---|---|
| DE | 102004048668 A1 | 4/2006 |

(Continued)

OTHER PUBLICATIONS

International Search Report dated May 24, 2011, from corresponding International Patent Application No. PCT/US2010/060518.

(Continued)

*Primary Examiner* — Tuan A Tran

(57) ABSTRACT

Communications are established with a first base station and the communications include first validation information associated with the first base station. Second validation information is obtained and the second validation information is stored in a data structure. The second validation information is associated with a second and valid base station. The first validation information is compared to the second validation information stored in the data structure and it is determined whether the first base station is valid based upon the comparison. When the comparing indicates that the first base station is not valid, a warning is initiated to a user.

17 Claims, 3 Drawing Sheets

(56) References Cited

U.S. PATENT DOCUMENTS

| | | |
|---|---|---|
| 2006/0007039 A1 | 1/2006 | Duvall |
| 2006/0267744 A1 | 11/2006 | Baumgartner et al. |
| 2007/0049323 A1* | 3/2007 | Wang et al. .................. 455/525 |
| 2007/0079376 A1* | 4/2007 | Robert et al. .................. 726/23 |
| 2007/0200688 A1 | 8/2007 | Tang et al. |
| 2008/0186932 A1* | 8/2008 | Do et al. ....................... 370/338 |
| 2009/0036098 A1* | 2/2009 | Lee et al. ...................... 455/411 |

FOREIGN PATENT DOCUMENTS

| | | | |
|---|---|---|---|
| EP | 0167442 | A2 | 1/1986 |
| EP | 1362753 | A1 | 11/2003 |
| EP | 1514444 | A1 | 3/2005 |
| EP | 1593564 | A1 | 11/2005 |
| EP | 1809057 | A1 | 7/2007 |
| EP | 2003818 | A1 | 12/2008 |
| EP | 2124428 | A1 | 11/2009 |
| GB | 2296843 | A | 7/1996 |
| GB | 2317418 | A | 3/1998 |
| GB | 2407455 | A | 4/2005 |
| GB | 2435987 | A | 9/2007 |
| GB | 2445046 | A | 6/2008 |
| GB | 2457102 | A | 8/2009 |
| WO | 95/33214 | A1 | 12/1995 |
| WO | 96/04155 | A1 | 2/1996 |
| WO | 00/21053 | A1 | 4/2000 |
| WO | 01/32481 | A1 | 5/2001 |
| WO | WO01/31797 | A1 | 5/2001 |
| WO | 03/103322 | A1 | 12/2003 |
| WO | 2005/112321 | A1 | 11/2005 |
| WO | 2006/092737 | A2 | 9/2006 |
| WO | 2007/019814 | A1 | 2/2007 |
| WO | 2008/111001 | A2 | 9/2008 |

OTHER PUBLICATIONS

International Search Report dated Jun. 1, 2011, from corresponding International Patent Application No. PCT/US2010/060723.
International Search Report dated Mar. 28, 2011, from corresponding International Patent Application No. PCT/US2010/060803.
International Search Report dated Apr. 15, 2011, from corresponding International Patent Application No. PCT/US2010/060773.
M. Mouly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated Mar. 10, 2011, from corresponding International Patent Application No. PCT/US2010/060811.
International Search Report dated Mar. 1, 2011, from corresponding International Patent Application No. PCT/US2010/060750.
International Search Report dated Feb. 28, 2011, from corresponding International Patent Application No. PCT/US2010/060532.
International Search Report dated Mar. 1, 2011, from corresponding International Patent Application No. PCT/US2010/060527.
International Search Report dated May 13, 2011, from corresponding International Patent Application No. PCT/US2010/060675.
International Search Report dated Jun. 28, 2011, from corresponding International Patent Application No. PCT/US2010/060795.
International Search Report dated Jun. 17, 2011, from corresponding International Patent Application No. PCT/US2010/060787.

* cited by examiner

| Valid network table |||||
|---|---|---|---|---|
| Number | BSIC | PLMN | neighboring cells | LAC |
| 1 | 12 | 310380 | 4 - 166, 160, 604, 602 | 5042 |
| 2 | 1232 | 310410 | 2 - 412, 604 | 17510 |
| 3 | 108 | 310380 | 3 - 126, 158, 414 | 25937 |
| .... | | | | |

400

APPARATUS AND METHOD FOR DETECTING A CLONED BASE STATION

CROSS REFERENCES TO RELATED APPLICATIONS

"Apparatus and Method of Detecting Jamming of Communications" having Ser. No. 12/643,049
"Apparatus and Method for Broadcasting the Detection of RF Jammer Presence" having Ser. No. 12/643,825
"Apparatus and Method for Compromised Vehicle Tracking" having Ser. No. 12/643,498
"Apparatus and Method for Detecting a Cloned Base Station" having Ser. No. 12/643,081
"Apparatus and Method for detecting Communication Interference" having Ser. No. 12/643,068
"Apparatus and Method for Determining an Invalid Base Station" having Ser. No. 12/643,463
"Apparatus and Method for Determining Vehicle Location" having Ser. No. 12/643,412
"Apparatus and Method for Maintaining Communication with a Stolen Vehicle Tracking Device" having Ser. No. 12/643,841
"Apparatus and Method for Reducing False Alarms in Stolen Vehicle Tracking" having Ser. No. 12/643,889
"Apparatus and Method for Tracking Stolen Vehicles" having Ser. No. 12/643,862
"Apparatus and Method for Maintaining Communications with a Vehicle in the Presence of Jamming" having Ser. No. 12/643,850
all of which being filed on the same date as the present application and both of which having their contents incorporated herein by reference in their entireties.

FIELD OF THE INVENTION

The field of the invention relates to communications and more specifically to detecting the presence of cloned base stations.

BACKGROUND

Vehicles are equipped with various types of communication systems that provide or facilitate various types of functions. For instance, a vehicle may be equipped with a Global Positioning Satellite (GPS) location determination system that communicates with a GPS satellite and provides the ability to locate and track the vehicle. Vehicle security systems are also widely used in vehicles today. For example, a security system may communicate with an outside entity and when an attempt is made to break into a vehicle, the security system may attempt to warn a private security center (or some other appropriate entity such as the police) that a break-in is occurring. Some jurisdictions require the use of vehicle security systems because of the high number of vehicle break-ins or thefts in these areas.

Stolen vehicle tracking (SVT) applications also exist where a vehicle is provided with components that can detect if a vehicle is stolen and/or assist in the tracking of the stolen vehicle. Many SVT approaches rely upon GPS technology to pinpoint the location of the vehicle and a Global System for Mobile communications (GSM) cellular network to report the incident to a service provider via Short Messaging Service (SMS) or General Packet Radio Service (GPRS) data connection. Other examples of connections and protocols can be used.

Potential vehicle thieves have sometimes attempted to jam the receiver hardware at the vehicle by using a device that creates a strong wide-band signal in the receive band to block the GPS satellite and GSM network signals to the vehicles. In so doing, the theft of the vehicle could not be detected or reported.

In other examples, thieves or other criminals attempted to clone base stations. That is, the services of a base station are imitated by devices provided by the criminal and once a user (or the user's device) establishes communication with the cloned base station, the user or device incorrectly believed that the cloned base station was a valid base station. Thus, among other problems, the vehicle's security system were often fooled into sending warning messages to an invalid base station, no action was taken by the cloned base station (since it was provided by the criminal), and the vehicle was stolen without detection. Previous attempts at detecting jamming, detecting the presence of cloned base stations, and reporting these occurrences to a security center have generally been unsuccessful, slow, and/or expensive to accomplish.

Figure 1:
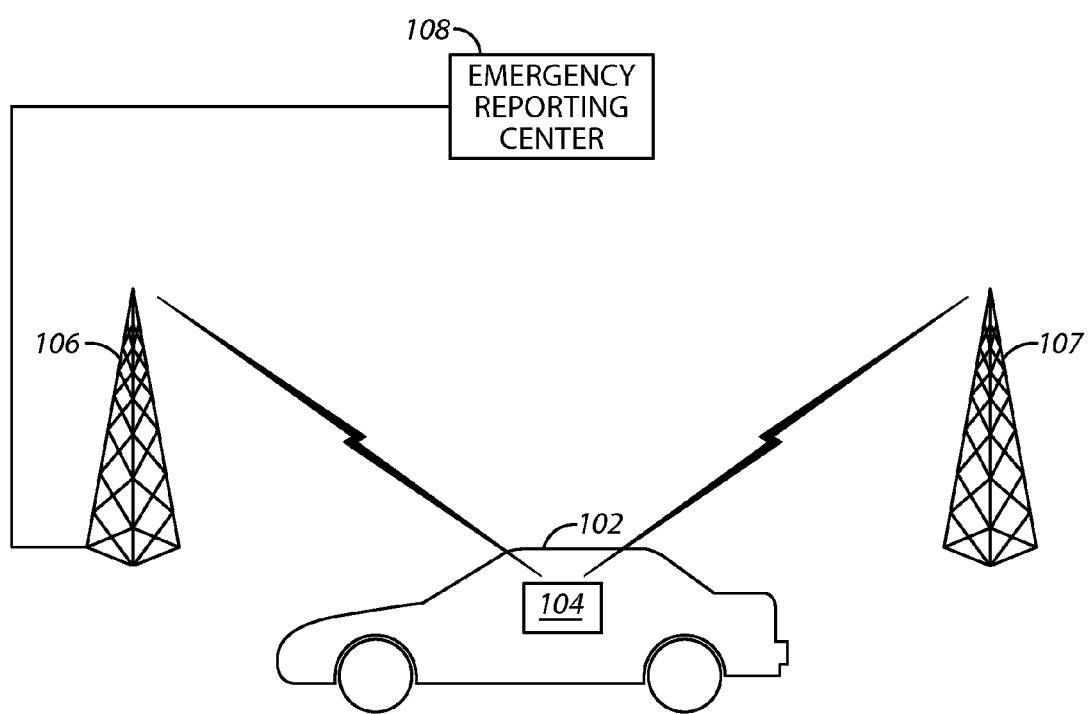
FIG. 1 comprises a block diagram of a system for determining the presence of a rogue base station according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a rogue or invalid base station is detected so that appropriate actions can be taken to prevent vehicle break-in or vehicle theft. The approaches described herein can easily be retrofitted to existing systems and devices, are quick and easy to perform, and are accurate in determining the presence of a rogue base station or base station simulator.

In many of these embodiments, communications are established with a first base station and the communications include first validation information associated with the first base station. Second validation information is obtained and the second validation information is stored in a data structure such as a table or linked list. The second validation information is associated with a second and valid base station. The first validation information is compared to the second validation information stored in the data structure and it is determined whether the first base station is valid based upon the comparison. When the comparison indicates that the first base station is not valid, a warning is initiated to a user.

As used herein, the term "valid" denotes a base station that is accepted to a reasonable degree of certainty to be a legitimate base station that is not part of a criminal enterprise. The degree of certainty can vary in these examples. In one approach the degree of certainty is approximately 90%. In contrast, a "rogue", "invalid", or "cloned" base station as used herein refers to a base station that is used illegally or improperly to foster criminal activity such as the theft of a vehicle protected by some sort of vehicular security system or vehicle tracking system. The rogue, invalid, or cloned base station may be a simulator, i.e., it may not include some or all the physical components (e.g., transmission tower) of a valid base station.

In other aspects, the presence of a neighboring base station identified in the data structure is scanned for by the mobile communication device and when a signal strength level of the neighboring base station obtained by the scanning is below a predetermined threshold level, a warning is issued to the user that a cloned or rogue base station has been detected.

In still other examples, the data structure is built or constructed in a memory. The data structure includes information obtained from an external source upon a successful communication with a known and valid service provider. In some aspects, the information is downloaded from the known and valid service provider in order to build the data structure. In other aspects, information is downloaded from the known and valid service provider periodically. The data structure may be downloaded asynchronously or synchronously.

In still other examples, a communication link is established with a back end device or service. Data is added to the data structure when the establishment of the communication link is successful.

In others of these embodiments, communications are established with a first base station and a mobile wireless device at a vehicle. The communications include first validation information associated with the first base station. Second validation information is obtained and the second validation information is stored in a data structure at the mobile wireless device. The second validation information is associated with a second and valid base station. The first validation information is compared to the second validation information stored in the data structure and it is determined whether the first base station is valid based upon the comparison. When the comparison indicates that the first base station is not a valid base station, a warning is initiated to a user.

In others of these embodiments, an apparatus for detecting a cloned or rogue base station includes a communication interface, a memory, a warning indictor, and a controller.

The communication interface is configured to establish communications with a first base station. The communications include first validation information associated with the first base station.

The memory includes a data structure such as a table or a linked list. The controller is coupled to the communication interface, the memory, and the warning indicator. The controller is configured to obtain second validation information via the communication interface and store the second validation information in the data structure in the memory. The second validation information is associated with a second and valid base station. The controller is further configured to compare the first validation information to the second validation information stored in the data structure and determine whether the first base station is valid based upon the comparison. The controller is further configured to, when the comparing indicates that the first base station is not valid, initiate a warning to a user via the warning indicator. Other actions may also be taken.

In other aspects, the controller is further configured to scan for a presence of a neighboring base station identified in the data structure via the communication interface (which may include one or more antennas). When a signal strength level of the neighboring base station obtained by the scanning is below a predetermined threshold level, a warning is initiated or presented to the user via the warning indicator that a cloned base station has been detected.

In still other examples, the controller is configured to build the data structure in memory. The data structure includes information obtained from an external source upon a successful communication with a known and valid service provider. The information is downloaded from the known and valid service provider to build the data structure. In other examples, the information is downloaded from the known and valid service provider periodically. In still other examples, information to be included in the data structure is downloaded asynchronously while in other examples the information is downloaded synchronously.

The warning indicator may assume a variety of different forms. In one example, the warning indicator includes or is an audio speaker. In other examples, visual elements (e.g., flashing lights or flashing headlights) may be used. In still other examples, combinations of audible and visual elements or devices are used (e.g., a honking horn). Other examples of warning indicators are possible. The warning indicator may be actuated before the user exits the vehicle.

Referring now to FIG. 1, one example of a system for detecting a cloned or rogue base station (or base station simulator) is described. Although the examples described herein relate to vehicular communications or the tracking of vehicles, it will be appreciated that these approaches are not limited to devices deployed at or in vehicles and are specifically not limited to providing vehicular security. To the contrary, these approaches may be deployed at any location and provide security for any type of entity.

As shown in FIG. 1, a vehicle 102 includes a communication device 104. The communication device 104 communicates with a known and valid base station 106. The approach of comparing the base station information to the stored database information can be used to determine that the base station is valid. If the valid base station is being used to download the database information, then some sort of authentication mechanism can be used as is known to those skilled in the art. A new base station 107 is detected. The communication device 104 determines if the base station 107 is a rogue base station by the approaches described herein. The communication device 104 may be implemented by any combination of hardware and programmed software to implement this or other functions. The communication device 104 communicates with entities outside the vehicle 102 using any type of communication technology or protocol. The communication device 104 may be a wide variety of wireless devices such as a cellular phone, a transponder, a radio, a pager, a personal digital assistant, or a personal computer to name a few examples. Other examples are possible.

Besides the detection of rogue base stations (or base station simulators), the communication device 104 may perform other functions and/or be incorporated into an existing device. As mentioned, the communication device 104 may be a cellular phone, transponder, radio, or some combination of these or other devices. In other examples, the communication device 104 is not part of an existing device, but is deployed as a stand-alone unit including a separate housing structure or enclosure (apart from other portable devices that may be present in the vehicle 102). In this case, the communication device 104 may be communicatively coupled to and communicate with other devices (e.g., cellular phones).

The vehicle 102 may be any type of vehicle such as a car, truck, bus, airplane, ship, to name a few examples that are used to transport one or more persons. However, as mentioned above, these approaches are not limited to in-vehicle environments and applications and may be used in other environments such as homes and businesses to name two examples.

The base station 106 is any type of base station as known to those skilled in the art. In this respect it may be a cellular base station such as AT&T cellular tower manufactured by Lucent Technologies. Other examples of base stations are possible. In others of these examples, the base station 106 is a valid base station and communications are established (or are attempted to be established) with a rogue base station subsequent to establishing communications with the valid base station. In this example, a rogue base station 107 (or base station simulator) exists and the communication device 104 in the vehicle 102 attempts to establish communications with the rogue base station.

In one example of the operation of the system of FIG. 1, the vehicle 102 and communication device 104 operate in a Global System for Mobile communications (GSM) cellular network. Each base station transmits information that can be used to identify the base station. In this regard, base station ID (BSIC) information, Public Land Mobile Network ID (PLMN) information, neighboring cell information, base station Location Area Code (LAC), and Cell Identification (CI) information may be transmitted and utilized to identify a particular base station.

The rogue base station 107 may not be transmitting base station information that is valid for the current location of the cellular device. Consequently, when the device 104 detects this condition, then it determines that a rogue base station 107 exists and can transmit or provide appropriate alerts and/or take other appropriate actions.

A database of known GSM cellular base stations (i.e., valid base stations not rogue simulators) is maintained at the device 104 and/or elsewhere such as at the valid base station 106. In one example, this database includes the location of the base station (latitude and longitude), known base station information for comparison (e.g., BSIC, PLMN, neighbor cells, LAC, CI and so forth). Other types of information may also be included. When a new base station is detected while scanning, the device 104 compares the base station information to the stored information for base stations that could be detected based upon the cellular device location to determine if the new base station that has been detected is a rogue base station.

The base station information provided can be matched with general location information to determine the general legitimacy of the base station. In one example, the Mobile Country Code (MCC) can be used. The MCC is typically part of the base station PLMN and identifies the country of the base station. When a new base station is detected while scanning, the MCC is used to determine the base station country location. If that country is not where the cellular device is currently located or the MCC of the base station does not match any valid MCC for any country, then there is a good chance that the base station found is a rogue base station. In this context, the term "high" means more likely than not, for example, having greater than approximately a 75% chance of being a rogue base station.

For example, the cellular device is currently in Great Britain based upon the cellular device location. The cellular device detects a new base station which is transmitting a PLMN with an MCC that is assigned to the United States. Because there is no possibility that a base station from the United States could be transmitting in Great Britain, the cellular device is reasonably certain that the base station is a rogue base station and appropriate action can be taken.

Various actions can be taken once jamming or the detection of a rogue base station occurs. As mentioned, a warning message can be transmitted to an emergency reporting center 108. The emergency reporting center is coupled to the base station 106. For example, this warning message may be transmitted over a GSM network. In other examples, other frequencies and/or other types of networks in addition to or instead of the GSM network can be used to transmit the warning message (and/or transmit or receive other communications). For example, warning messages may be transmitted at FM Radio Data System (RDS) frequencies, over Wireless Local Area Networks such as WiFi networks, over infrared (IR) networks, Bluetooth (BT) networks, to "amber alert" stations (e.g., using the Emergency Alert System (EAS) or Emergency Broadcast System (EBS)), over Worldwide Interoperability for Microwave Access (WiMAX) networks, over Code Division Multiple Access/Integrated Digital Enhanced Network (CDMA/iDEN) systems, and/or over Advanced Mobile Phone System (AMPS) networks. In addition, Morse code (or some other coding approach) may be transmitted using the horn and/or headlights of the vehicle 102 (or some other device in the vehicle). In still other examples, a short messaging service (SMS) cell broadcast is made once jamming is detected. Other examples are possible.

Broadcast FM RDS uses a sub-carrier to communicate digital information to the user's radio and to the user. The information for the user is text, such as the station call sign, and is usually presented to the user on the display of the car radio. In the present approaches, RDS may be used to carry a warning message would be to have the SVT unit transmit an RDS message on one or more broadcast FM channels with a text message such as "Help! Stolen Car: silver Chevy license 997 KLM". This message would be received in the vicinity of the stolen vehicle and could be seen by drivers whose cars are in the vicinity of the stolen vehicle. Even though nearby drivers are listening to a standard broadcasting station on the same frequency, the signal from the SVT unit would be received due to its higher signal strength at the receiver due to the small separation distance. One of these drivers could then make a call to the police or some other authority. Due to the short range nature of the communications, the stolen vehicle would be in the vicinity of this person's car.

A security beacon can be activated once jamming is detected. For example, a security beacon such as those manufactured by the LoJack Corporation can be used. The security beacon transmits signals that can be detected and used to locate the vehicle 102. The security beacon can be used in addition to or in place of the communications (e.g., warning messages) that are transmitted, for example, over GSM systems.

In another example, the communication device 104 can transmit a periodic (or non-periodic) "pinging" signal to a server (e.g., a schema validation tool (SVT) server). If the server detects no pinging signal, it may assume that the vehicle is stolen. The server, in this example, is external to the vehicle 102.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

In another aspect, once jamming or the presence of a rogue base station are detected various actions can be taken that affect the operation of the vehicle and/or a driver's ability to successfully drive the vehicle 102. In these examples, it is assumed that the detection of jamming denotes an attempt to steal by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

In some examples, areas of known good signal strength are located by the communication device 104 and/or some external device or system. If the signal from the device stops without the vehicle moving, jamming is determined to be occurring. In other aspects, areas of known good signal strength are determined (e.g., a known good signal strength for a particular area, time, or other parameter), and if the signal transmitted from the device varies significantly (e.g., beyond a threshold amount) from expected levels jamming is determined to be occurring. The threshold can be based upon map data provided by a system or device that is disposed external to the communication device 104 and/or developed by the device 104 from previous readings (e.g., previous drives) to name two approaches.

In other aspects, the location of the vehicle 102 can be tracked even as jamming is occurring. For instance, Rx Level and/or Rx Qual readings (e.g., reported by one or more communication devices to an external service center) may be used to identify and/or confirm jammer presence and pinpoint location of the vehicle 102, for example, using triangulation approaches.

In some aspects, the communication device may authenticate the base station 106. For example, various hand-shaking approaches may be used by the communication device to authenticate the base station 106.

Figure 2:
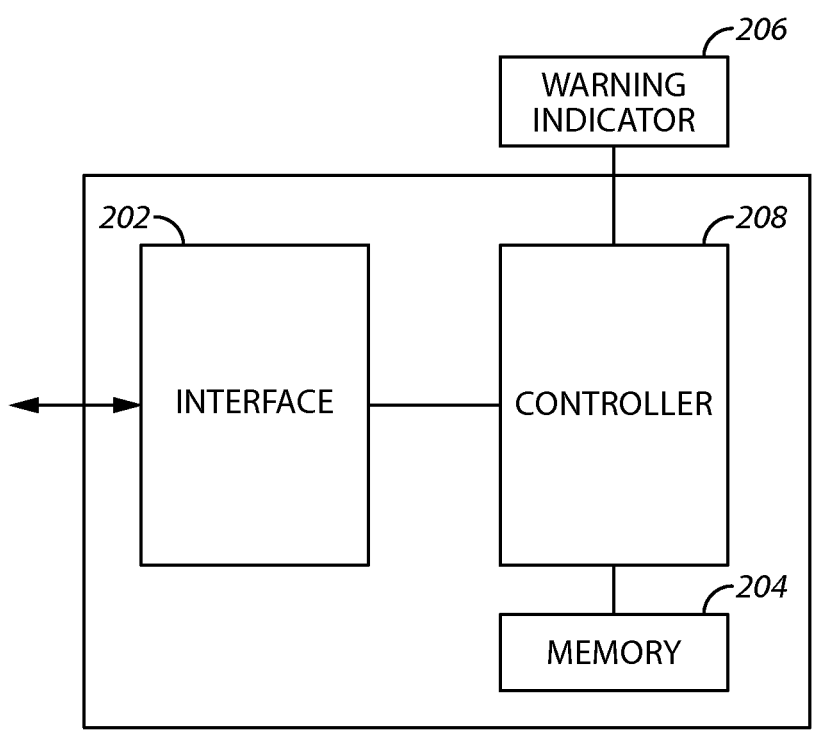
FIG. 2 comprises a block diagram of a mobile communication device for determining the presence of a rogue base station according to various embodiments of the present invention.

Referring now to FIG. 2, an apparatus 200 for detecting a cloned or rogue base station includes a communication interface 202, a memory 204, a warning indictor 206, and a controller 208. The communication interface 202 is configured to establish communications with a first base station (e.g., connect to a GSM base station to obtain cellular service via standard cellular communication channels). The communications so established include first validation information associated with the first base station.

The memory 204 includes a data structure such as a table or a linked list. Other examples of data structures are possible. The controller 208 is coupled to the communication interface 202, the memory 204, and the warning indicator 206. The controller 208 is configured to obtain second validation information via the communication interface 202 and store the second validation information in the data structure in the memory 204. The second validation information is associated with a second and valid base station. The controller 208 is further configured to compare the first validation information to the second validation information stored in the data structure and determine whether the first base station is valid based upon the comparison. The controller 208 is further configured to, when the comparing indicates that the first base station is not valid, initiate a warning to a user via the warning indicator 206.

In other aspects, the controller 208 is further configured to scan for the presence of a neighboring base station identified in the data structure via the communication interface 202. When a signal strength level of the neighboring base station obtained by the scanning is below a predetermined threshold level, a warning is initiated to the user via the warning indicator 206 that a cloned base station has been detected. In one example, a warning may be indicated when the reading is 20 dB less than expected. Other examples are possible.

In still other examples, the controller 208 is configured to build the data structure in the memory 204. The data structure includes information obtained from an external source obtained upon a successful communication with a known and valid service provider. The information is downloaded from the known and valid service provider to build the data structure. In other examples, the information is downloaded from the known and valid service provider periodically. In still other examples, information to the data structure is downloaded asynchronously while in other examples it is downloaded synchronously.

The warning indicator 206 may assume a variety of different forms. In one example, the warning indicator 206 includes or is an audio speaker. In another example, the warning indicator 206 is a visual indicator such as a flashing light. In still other examples, the warning indicator 206 is combinations of visual and audible indicators. Other examples of warning indicators are possible.

Figures 3, 4:
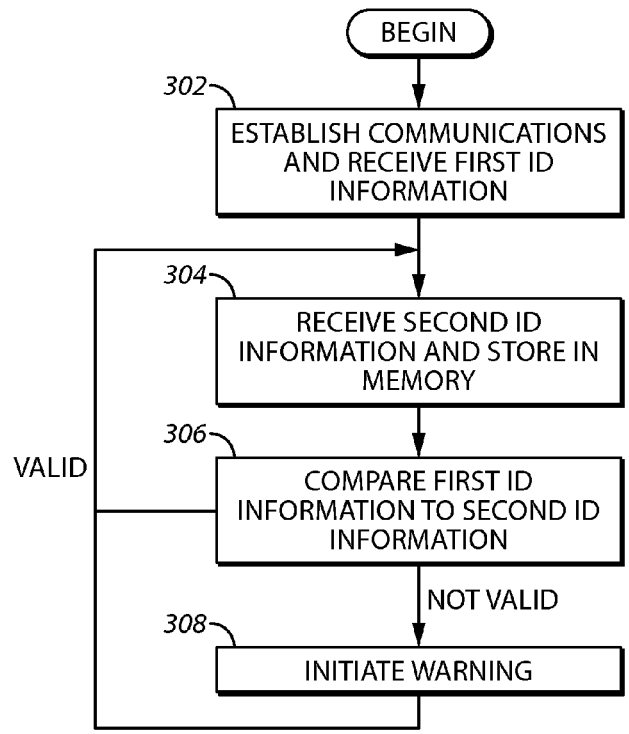
FIG. 3 comprises a flowchart of an approach for determining the presence of a rogue base station according to various embodiments of the present invention.
FIG. 4 comprises a block diagram of a data structure used for determining the presence of a rogue base station according to various embodiments of the present invention.

Referring now to FIG. 3, an approach for determining the existence of a rogue or cloned base station is described. In some examples, these approaches are performed at a mobile communication device. In other examples, some or all of these steps are performed at other devices such as base stations or at a service provider. At step 302, communications are established between a device (e.g., a mobile wireless device) and a first base station and the communications include first validation information associated with the first base station.

At step 304, second validation information is obtained and the second validation information is stored in a data structure such as a table or linked list. The data structure is stored in a memory device. Other examples of data structures are possible. The second validation information is associated with a second and valid base station.

At step 306, the first validation information is compared to the second validation information stored in the data structure and it is determined whether the first base station is a valid base station based upon the comparison. When the comparing indicates that the first base station is not valid, at step 308, a warning is initiated to a user. To take one example, the first validation information is an MCC code and this is compared against the known and valid code stored in the data structure.

In other aspects, the presence of a neighboring base station (identified in the data structure) is scanned for and when a signal strength level of the neighboring base station obtained by the scanning is below a predetermined threshold level, a warning is issued to the user that a cloned or rogue base station has been detected.

In still other examples, the data structure is built in the memory device. The data structure includes information obtained from an external source upon a successful communication with a known and valid service provider. In some aspects, the information is downloaded from the known and valid service provider to build the data structure. In other aspects, information is downloaded from the known and valid service provider periodically. The information to the data structure may be downloaded asynchronously or synchronously.

In still other examples, a communication link is established with a back end device or service. Data is added to the data structure when the establishing is successful.

Referring now to FIG. 4, one example of a data structure (e.g., a table 400) stored in memory of a mobile communication device that is used to implement the approaches described herein is described. As shown in FIG. 4, the table 400 includes a number column 402, a BSIC column 404, a PLMN column 406, a neighboring cells column 408, and a LAC column 410.

The first column 402 in the table is a sequential reference number (i.e., row 1, row 2, row 3, etc.) and doesn't have any bearing other than for human readability. The remaining columns 404, 406, 408, and 410 in the table are various pieces of information that are transmitted by every GSM base station to identify the base station. When the device finds a new base station, it goes through the table 400 trying to match the information transmitted by the base station to a row in the table. If no match is found, then the base station is likely a rogue base station and some type of jamming is being attempted (in this case, simulating a system to block out the real network).

The BSIC (Base Station Identity Code) column 404 includes an identification number transmitted by the base station. The PLMN (Public Land Mobile Network) column 406 includes a 5 or 6 digit number identifying the country (mobile country code) and network (mobile network code). Each carrier in a country is assigned one or more PLMNs for their network. They are only allowed to use the PLMN assigned to them. So, the PLMN can be used to identify if the carrier is AT&T, T-mobile, Orange, Telefonika, and so forth. The neighboring cells column 408 includes a list of the cell towers that are around the current cell tower transmitting the information. Typically, all cell towers will have at least one neighbor, because they are all in a network. If there are no neighboring cells provided by the current network then that is suspicious. Also, each cell tower will have known neighbors because cell towers are physically fixed. The LAC (Location Area Code) column 410 defines a sub-region inside of a PLMN. For example, the United States is assigned 6 mobile country codes, although 310 is typically used in the PLMN. Then, the United States is further divided into regions (e.g., states, counties, and so forth) and each region is assigned it's own LAC.

The valid network table 400 will have many entries, because there are so many networks and so many cell towers. There will likely be one entry (row) in the table for each known cell tower. In one example, assume that the valid network table only has the 3 entries that are currently listed. The module is powered up and searches for a network. It finds a network that is transmitting a BSIC of 1232, a PLMN of 310410, a LAC of 17510, and it indicates that there are 2 neighboring cells on channels 412 and 604. Consequently, the module searches through the valid network table to find a match. The first entry in the table 400 has a BSIC of 12, which does not match the BSIC of the current network (1232), so the first entry is skipped. The second entry in the table 400 matches with the current network (BSIC, PLMN, neighboring cell information, and LAC). Thus, a match is found and the network is considered to be a good, valid network, not a rogue and the possibility of jamming/spoofing is reduced.

Now, the module finds a new network is available. The new network is transmitting a BSIC of 108, a PLMN of 310380, a LAC of 17510, and 1 neighboring cell on channel 414. Again, the module searches through the valid network table to find a match. The first entry in the table has a BSIC of 12, which does not match the BSIC of the current network (108), so the first entry is skipped. The second entry in the table has a BSIC of 1232, which does not match the BSIC of the current network (108), so the second entry is skipped. The third entry has a BSIC that matches the current network (108) and a PLMN that matches the current network (310380), but the table entry has a LAC of 25937, which does not match the LAC of the current network (17510). At this point, the table 400 has been exhausted and no match was found. Consequently, it is likely that the current base station found is a rogue base station and appropriate action taken.

Thus, approaches are provided where a rogue or invalid base station is detected so that appropriate actions can be taken vehicle to prevent break-in or vehicle theft. The approaches described herein can easily be retrofitted to existing systems and devices, are quick and easy to perform, and are accurate Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of detecting a cloned base station:
   establishing communications with a first base station, the communications including first validation information associated with the first base station;
   obtaining second validation information and storing the second validation information in a data structure, the second validation information being associated with a second and valid base station;
   comparing the first validation information to the second validation information stored in the data structure and determining whether the first base station is valid based upon the comparing;
   when the comparing indicates that the first base station is not valid, initiating a warning to a user; and
   scanning for a presence of a neighboring base station identified in the data structure and when a signal strength level of the neighboring base station obtained by the scanning is below a predetermined threshold level, initiating a warning to the user that a cloned base station has been detected.

2. The method of claim 1 further comprising building the data structure in memory, the data structure comprising information obtained from an external source upon a successful communication with a known and valid service provider.

3. The method of claim 2 wherein the information is downloaded from the known and valid service provider to build the data structure.

4. The method of claim 2 wherein information is downloaded from the known and valid service provider periodically.

5. The method of claim 2 wherein information is downloaded asynchronously to the data structure.

6. The method of claim 1 further comprising establishing a communication link with a back end device and responsively adding data to the data structure when the establishing is successful.

7. A non-transitory computer usable medium having a computer readable program code embodied therein, said computer readable program code adapted to be executed to implement a method of detecting a cloned base station from a vehicle, the method comprising:
   establishing communications between the vehicle and a first base station, the communications including first validation information associated with the first base station;
   obtaining second validation information and storing the second validation information in a data structure at the vehicle, the second validation information being associated with a second and valid base station;
   comparing the first validation information to the second validation information stored in the data structure and determining whether the first base station is valid based upon the comparing;
   when the comparing indicates that the first base station is not valid, initiating a warning to a user at the vehicle; and
   scanning for a presence of a neighboring base station identified in the data structure and when a signal strength level of the neighboring base station obtained by the scanning is below a predetermined threshold level, initiating a warning to the user that a cloned base station has been detected.

8. The computer usable medium of claim 7 further comprising building the data structure in memory at the vehicle, the data structure comprising information obtained from an external source upon a successful communication with a known and valid service provider.

9. The computer usable medium of claim 8 wherein the information is downloaded to the vehicle from the known and valid service provider to build the data structure.

10. The computer usable medium of claim 8 wherein information is downloaded to the vehicle from the known and valid service provider periodically.

11. The computer usable medium of claim 8 wherein information is downloaded asynchronously to the data structure at the vehicle.

12. An apparatus for detecting a cloned base station:
   a communication interface configured to establish communications with a first base station, the communications including first validation information associated with the first base station;
   a memory comprising a data structure;
   a warning indicator;
   a controller coupled to the communication interface, the memory, and the warning indicator, the controller configured to obtain second validation information via the communication interface and store the second validation information in the data structure in the memory, the second validation information being associated with a second and valid base station, the controller being further configured to compare the first validation information to the second validation information stored in the data structure and determine whether the first base station is valid based upon the comparison, the controller being further configured to, when the comparing indicates that the first base station is not valid, initiate a warning to a user via the warning indicator, wherein the controller is further configured to scan for a presence of a neighboring base station identified in the data structure via the communication interface and when a signal strength level of the neighboring base station obtained by the scanning is below a predetermined threshold level, initiate a warning to the user via the warning indicator that a cloned base station has been detected.

13. The apparatus of claim 12 wherein the controller is further configured to build the data structure in memory, the data structure comprising information obtained from an external source upon a successful communication with a known and valid service provider.

14. The apparatus of claim 13 wherein the information is downloaded from the known and valid service provider to build the data structure.

15. The apparatus of claim 13 wherein information is downloaded from the known and valid service provider periodically.

16. The apparatus of claim 13 wherein the warning indicator is selected from the group consisting of an audio speaker, flashing vehicular lights, and a honking horn.

17. An apparatus for detecting a cloned base station:
   a communication interface configured to establish communications with a first base station, the communications including first validation information associated with the first base station;
   a memory comprising a data structure;
   a warning indicator;
   a controller coupled to the communication interface, the memory, and the warning indicator, the controller configured to obtain second validation information via the communication interface and store the second validation information in the data structure in the memory, the second validation information being associated with a second and valid base station, the controller being further configured to compare the first validation information to the second validation information stored in the data structure and determine whether the first base station is valid based upon the comparison, the controller being further configured to, when the comparing indicates that the first base station is not valid, initiate a warning to a user via the warning indicator, wherein the warning indicator is configured to be actuated before a user exits the vehicle.

* * * * *